United States Patent

Lemelson

[15] 3,636,273

[45] Jan. 18, 1972

[54] APPARATUS FOR DRIVING TAPE IN A CARTRIDGE

[72] Inventor: Jerome H. Lemelson, 85 Rector Street, Metuchen, N.J. 08840

[22] Filed: July 6, 1970

[21] Appl. No.: 52,205

Related U.S. Application Data

[63] Continuation-in-part of Ser. No. 463,097, June 11, 1965, Pat. No. 3,555,245, and a continuation-in-part of 142,748, July 28, 1961, which is a continuation-in-part of Ser. No. 515,417, June 14, 1955, Pat. No. 3,003,109.

[52] U.S. Cl. .......... 179/100.2 Z, 242/197

[51] Int. Cl. .......... G11b 5/54, G11b 23/04

[58] Field of Search .......... 179/100.2 Z, 100.2 MT, 100.3 B, 179/100.1 R, 100.1 A; 274/4 B, 4 C, 4 E, 11 C, 11 B, 4 D, 11 D; 242/197–200; 340/174.1 C

[56] References Cited

UNITED STATES PATENTS

| | | | |
|---|---|---|---|
| 2,466,124 | 5/1949 | Owens | 179/100.3 B |
| 2,914,620 | 11/1959 | Dale | 179/100.2 Z |
| 2,914,752 | 11/1959 | MacDonald | 340/174.1 C |
| 3,102,699 | 9/1963 | Proctor | 242/200 |
| 3,146,316 | 8/1964 | Knoth | 179/100.2 Z |
| 3,183,494 | 5/1965 | Welsh | 179/100.2 Z |
| 3,285,612 | 11/1966 | Hallamore | 274/11 C |
| 3,394,899 | 7/1968 | Schoenmakers | 242/198 |

*Primary Examiner*—Stanley M. Urynowicz, Jr.
*Assistant Examiner*—Raymond F. Cardillo, Jr.

[57] ABSTRACT

A tape cartridge and record player unit therefore are provided whereby the cartridge is releasably positioned on the player unit for transducing relative to the tape therein by automatically engaging the hub of a tape storage reel in the cartridge and driving same during the transducing operation to permit movement of the tape past a transducing means. In one form, tape-driving mechanism is normally retracted out of the way of the tape cartridge and projects to engage the hub of the reel mounted in the cartridge so as to effect driving coupling therewith while a cooperating drive mechanism simultaneously is projected from a retracted position against the tape in the cartridge to frictionally engage and drive the tape during the transducing operation.

9 Claims, 4 Drawing Figures

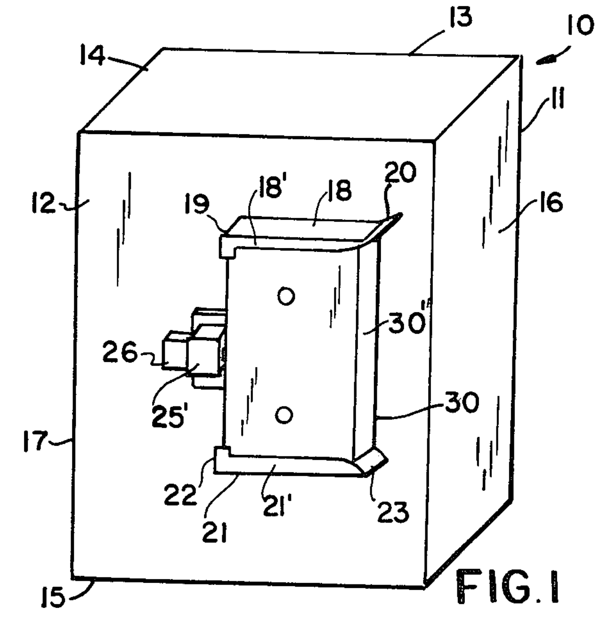
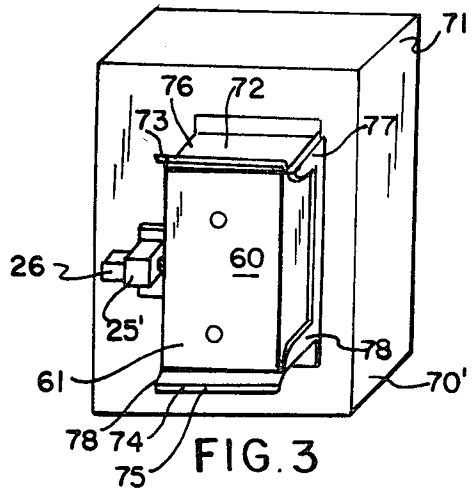
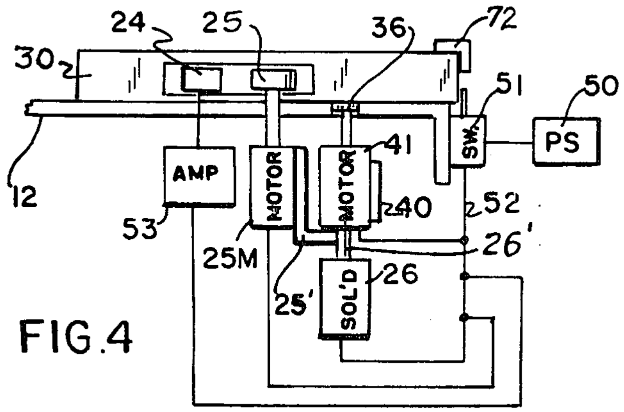
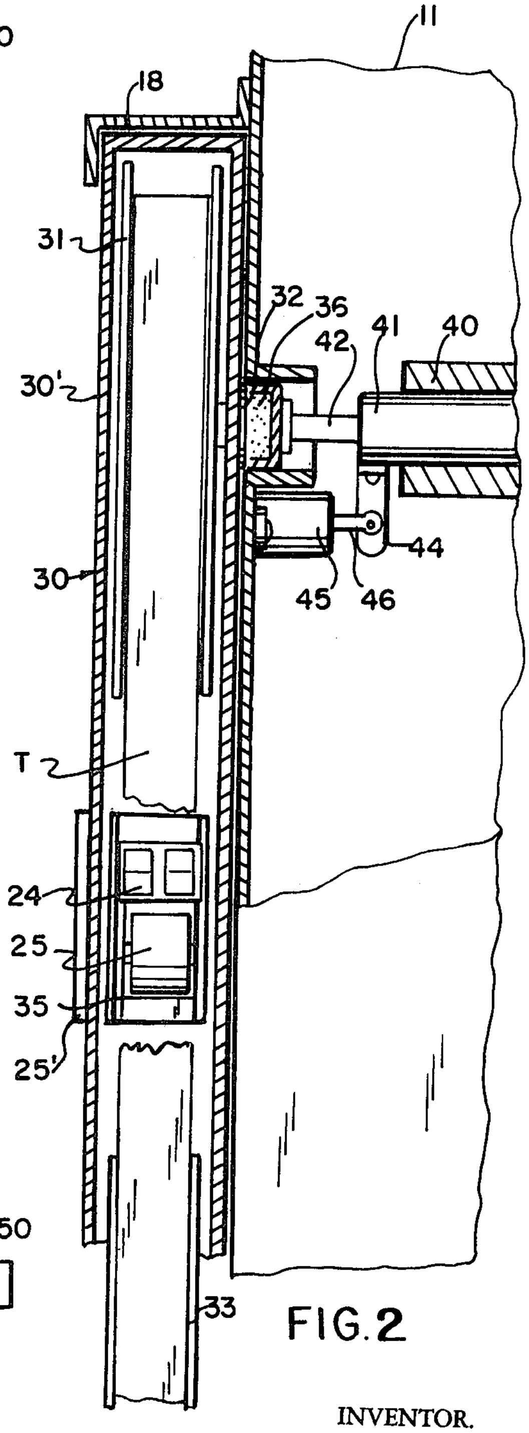
INVENTOR.
JEROME H. LEMELSON
BY

APPARATUS FOR DRIVING TAPE IN A CARTRIDGE

RELATED APPLICATIONS

This is a continuation-in-part of application Ser. No. 463,097 filed June 11, 1965, for Tape Cartridge and Reader now U.S. Pat. No. 3,555,245 and application Ser. No. 142,748 filed Aug. 28, 1961, for Computing Apparatus which has as a parent application Ser. No. 515,417 filed June 14, 1955, now U.S. Pat. 3,003,109 entitled Beam Tube Having Selective Switching Means.

SUMMARY OF THE INVENTION

This invention relates to a transducing apparatus employing flexible recording tape which is supported by one or more reels in a housing defining a cartridge or cassette which may be removably supported against the face of a housing containing transducing means and means for driving the tape of the cartridge past the transducing means.

Various arrangements have been proposed for transducing relative to record tape such as magnetic recording tape which is provided in a housing and is either retained within the housing or may be drawn therefrom and returned thereto by automatic operating means associated with the recording and/or playback unit. Depending on how the tape cartridge is supported on the playback unit and the type of transducer employed to record or play back the recordings of the tape as well as the means for manipulating the tape, various mechanical arrangements have been provided to effect the coupling and uncoupling of the tape drive and transducing means with the mechanism of the cartridge and the tape. The most common arrangement has been to dispose the cartridge so that the openings therein which extend through the hubs of the reels are pushed over the projecting ends of the motor-driven drive shafts supported by the record player unit. However, such an arrangement has a number of shortcomings, including the necessity of positively aligning the cartridge housing on the record playback unit so that the hubs of the protruding drive shafts will be properly centered within the openings in the cartridge and the hubs of the tape reels. In the prior art devices, this function has been performed with difficulty.

It is, accordingly, a primary object of this invention to provide a new and improved apparatus for receiving a tape cartridge and coupling drive means thereof with the mechanism supporting the tape within the cartridge so that the tape may be automatically and easily wound or unwound thereafter.

Another object is to provide a tape cartridge and record player unit therefore wherein the cartridge may be rapidly and easily assembled with the record player unit without he need for substantial manipulation and prealignment of the cartridge on the record-playing unit.

Another object is to provide a tape cartridge and record playing unit therefore which may be easily and rapidly coupled to and uncoupled from the record-playing unit.

Another object is to provide a tape cartridge and record-playing unit wherein a mechanism associated with the record-playing unit effects the automatic coupling of a drive means therein with a tape drive means in the cartridge.

With the above and such other objects in view as may hereinafter more fully appear, the invention consists of the novel constructions, combinations and arrangements of parts which will be hereafter more fully described, but it is to be understood that changes, variations and modifications may be resorted to which fall within the scope of the invention as claimed.

In the drawings:

FIG. 1 is an isometric view of a tape cartridge and record playing unit with the cartridge operably assembled in one manner against the face of the record-playing unit;

FIG. 2 is an end view cross-sectional view taken laterally through a portion of the cartridge and record-playing unit of FIG. 1;

FIG. 3 is an isometric view of a tape cartridge record-playing unit.

The tape cartridge 11 of FIG. 1 in which the cartridge is initially prepositioned on the record-playing unit by suitable guides and retainers denoted 18 and 21 and FIG. 4 is a schematic diagram of a control system for controlling an apparatus of the types shown in FIGS. 1 to 3 as described herein.

In FIG. 1, the apparatus 10 includes a housing 11 shown as being substantially rectangular parallellepiped in shape having sidewalls 12 and 13, top and bottom walls 14 and 15 and end walls 16 and 17. The guide and prepositioning means 18 and 21 for the tape cartridge 30 is illustrated as comprising respective L-shaped brackets having respective end walls 19 and 22 and flared flange portions 20 and 23 for easily receiving the end of the cartridge 30. The cartridge is inserted between face flange portions 18′ and 21′ and the surface of the sidewall 12 of the housing 11 and slidably pushed until it engages the end walls 19 and 22 and is there positionally located to permit the movement of drive means associated with the playback unit 11 into operative engagement with the hubs of the tape reels in the cartridge housing for driving same.

The recording tape T shown in FIG. 2 is spirally wound on the two reels 31 and 33 which reels are rotationally mounted by means of their hubs within the housing 30′ of the cartridge 30 by conventional means. The tape T is guided by conventional means to unwind from one of the reels past an opening 35 in the end wall of the housing 30′ of the cartridge 30 and the onto the other reel.

Supported on a mount 23 in alignment with the opening 35 in the end wall of cartridge housing 30′ is a transducer head assembly 24 and tape drive wheel 25. The tape drive wheel 25 is power rotated at constant speed by a tape drive motor 25M, the motor and wheel being supported on a common mount 25′ which also supports the transducer head 24. The mount 25′ is supported at the end of a shaft 26′ of the bistable solenoid 26 so that the solenoid, when properly activated after the housing 30 is operatively supported against wall 12 may be utilized to project both the head 24 into operative coupling with the tape T and the drive wheel 25 into engagement with said tape against the depressor wheel supported by the housing 30′.

Supported within housing 11 is a drive motor 41 which may be a constant speed electric gear motor, the housing of which is slidably engaged within a slide-bearing mount 40 supported by the walls of housing 11. Connected to the end of the shaft 42 of motor 41 is a coupling rotor 36 operative to engage the hub 32 of reel 31 after the cartridge 30 is operatively positioned as shown in FIG. 1. A solenoid 45 supported by the sidewall 12 of housing 11 has an output shaft 46 which is pinned to a slotted hole (not shown) in a bracket 44 extending from the sidewall of the housing for the motor 41. Thus by selectively operating push-pull solenoid 45, it may be used to advance and retract the coupling rotor 36 at the end of the shaft 42 of motor 41 into and out of operative engagement with the hub 32 of the reel 31. When engaged with the hub of said reel, the coupling rotor 36 may be power rotated by proper operation of motor 41 to rotate reel 31 in the proper direction. A similar solenoid-motor mechanism may be utilized to drive a coupling device associated with the hub of reel 33 located in the other end portion of the housing 30′ of the cartridge 30 or a single mechanism may be employed to simultaneously advance and retract respective coupling devices for driving the respective reels 31 and 33 within the housing 30′.

Control of the solenoid 26, the solenoid 45 and motor 41, as well as the motor rotating drive wheel 25 and the switches providing electrical energy for energizing transducer 24 may be effected by a single manually operated switch located on the housing 11 or a limit switch depressed when the housing 30′ is at its operative location as illustrated in FIG. 4.

In FIG. 3 is shown another mounting arrangement for a tape cartridge 60 which may be similar in design to cartridge 30 of FIG. 1 or may be modified as to shape and reel hub coupling design. Prepositioning of the tape cartridge 60 in operative relation with the transducer, tape and reel drive means is effected by means of two brackets or shaped portions of the housing 71. The cartridge alignment means comprises first and second brackets 72 and 74 which are spaced-apart substantially the height or the length of the cartridge housing 61. The outer ends of brackets 72 and 74 have flared portions 73 and 75 to facilitate insertion of the cartridge. The forward and rear ends of brackets 72 and 74 contain respective end flange portions 76, 77, 78 and 79 thereby forming a framelike receptacle for the cartridge. When the cartridge 60 is pushed all the way to abut the face of the sidewall 70' of the housing 70, it is in operative location with respect to the described mount 25' for the transducing head and tape drive wheel, as well as the projectable coupling and drive means operative to engage and drive the hubs of the reels supported within the cartridge housing 61.

Variations in the designs of the tape magazines and the transducer and transport means hereinabove described are noted as follows:

The multiple feed and takeup reels for the tape may be replaced by an endless loop of tape and means for maintaining same in a spiral coil formation within the magazine housing whereby the described hub drive means may be operative to power rotate a platen or hub on which the coil of tape is mounted.

Various forms of recording and scanning may be employed by using the proper transducers cooperating with the tape by the means described. For example, signals may be magnetically recorded and reproduced from steel or plastic tape containing magnetic oxide, chromium dioxide or the like. Photographic film may be provided as the tape within the cartridge and may be read by a bank of photoelectric cells or photomultipliers mounted on the described transducer supports. One or more electron guns or lasers may also be utilized for recording on and/or reproducing from suitable plastic tape, magnetic tape, or photographic film defining the cartridge tape. The electron-beam-generating means or laser may be also supported on the described transducer mount and may include means for deflection controlling the write and/or read beam thereof. Recording may also be effected by a mechanical transducer, spark-generating means, etc. Reproduction from the recorded tape may be effected by limit switches, contact switches, fluidic means or other means.

Automatic means for loading and unloading tape cartridges on the reader may be provided utilizing gravity or motor-driven means to transport the cartridge to the operative position and convey it therefrom after the described drive means are retracted.

The apparatus illustrated in FIGS. 1 to 4 may also be utilized for scanning filmstrip such as the projection or scanning of document frames of a document storage and retrieval system, slide picture frames or motion picture frames by substituting a light source or optical system coupled to a light source for the transducer heads on mount 25' and a sprocket wheel, if necessary, for the drive wheel 25 and including mirror means inserted into or forming part of the tape cartridge housing for directing the light passed through the filmstrip to an objective lens system in the housing on which the cartridge is mounted.

Details of a typical control system for the apparatus of FIGS. 1–3 is illustrated in FIG. 4 wherein the tape cartridge 30 is shown operatively disposed against the receiving face of the wall 12 of the housing of the transducing-playback apparatus. The cartridge 30 is so located, that the actuator arm of a limit switch 51 becomes depressed or deflected by the cartridge, thereby completing a circuit between a power supply 50 and the various operating devices associated with the recording and/or playback of information relative to the tape T located in the cartridge housing. The output of the limit switch 51 is shown connected to monostable solenoid 26 which operates to project motor 41 causing the coupling device 36 on the end of its shaft to engage the hub of the reel within the cartridge around which the tape is wound. Connected to motor 41 is a second constant speed motor 25M which is also projected therewith to cause a capstan drive wheel 25 on the end of its shaft to engage the tape within the cartridge housing, preferably against a depressor wheel mounted therein for driving the tape past the transducing head 24 or head assembly. The head 24 is connected to an amplifier 53 which is also energized when the output 52 of limit switch 51 becomes energized. A second motor similar to motor 41 may also be projected by the solenoid 26 to engage its shaft with the hub of the second reel mounted within the tape cartridge housing so that both reels may be rotated simultaneously or a single drive unit employing one motor may be applied to drive both reels in the tape cartridge housing simultaneously. The output of amplifier 53 is connected to a speaker (not shown).

Initial movement of the cartridge 30 in the act of removing it from its operative location, is effective in deactivating switch 51 which opens, thereby disconnecting power supply 50 from motors 41, and 25M and amplifier 53. The deactivation switch 51 is also operative to cause solenoid 26 to retract the coupling devices connected thereto to cause same to disengage the reels and tape permitting the cartridge to be removed from the vicinity of the housing 11.

It is also noted that the apparatus illustrated in FIGS. 1 to 4 of the drawings may be modified insofar as the transducing means is concerned. For example, punched or printed record tape or filmstrip may replace the described magnetic recording tape and corresponding photo-optical switch or contact electric signal generating means may be mounted on the mount 25' to read the tape when the cartridge is in its operative location as described. Such transducing means may be projectable against the tape as described or may be retained stationery on its mounts away from the tape for reading or projecting light therethrough. The transducing means may also be energized and deenergized by operation of a switch such as switch 51 when the cartridge housing engages same as described.

I claim:

1. Tape storage and transducing apparatus comprising in combination with a support for said apparatus, a tape cartridge having substantially parallel sidewalls, end walls and a top and bottom wall, a record tape stored within said cartridge, means for operatively locating said cartridge on said support, an opening in a wall of said cartridge, supply means for said tape contained within said cartridge, takeup means supported within said cartridge and including a reel onto which said tape may be wound as received from said supply means, input coupling means accessible from the exterior of said housing for rotating said reel, means for guiding a free length of said tape from said supply means past said opening in said wall of said cartridge and then onto said reel, first drive means for said tape including a capstan and a depressor wheel respectively rotatably supported on opposite sides of said free length of said tape when said cartridge is operatively located on said support, means for relatively moving said capstan and said depressor wheel together to engage therebetween opposite faces of a portion of the free length of said tape in said cartridge, means for power rotating said capstan, transducing means supported by said support for transducing information relative to the tape in a cartridge, second drive means for rotating the reel of a cartridge, said second drive means including a shaft reciprocally supported on said support, coupling means supported by said shaft, means for power rotating said shaft, means for projecting and retracting said shaft to cause said shaft-coupling means to operatively engage and disengage said input coupling means for the reel of a cartridge operatively located on said support, and means for simultaneously causing said tape drive means to engage a portion of the free length of the tape in a cartridge when the cartridge is operatively located on said support and the projection and movement of said shaft-coupling means into engagement with said cartridge reel and thereafter simultaneously operate said first and second drive means to cause the tape to be driven past said opening and said reel to be driven to takeup said tape.

2. A tape storage and transducing apparatus in accordance with claim 1, including means for slidably guiding a tape cartridge into operative location with the sidewall of said housing so that the tape reel in the housing is predeterminately located whereby the projection of said shaft will cause said coupling means to be connected to the tape reel for properly driving the reel.

3. A tape storage and transducing apparatus in accordance with claim 1, including control means for said means for projecting and retracting said shaft, means for activating said control means by the movement of said cartridge to the operative location on said housing.

4. A tape storage and transducing apparatus in accordance with claim 1, said means for projecting and retracting said shaft comprising an electromechanical actuation means, said tape cartridge having an end wall, an opening in said end wall operative to become aligned with said transducing means when said cartridge is properly aligned on said housing, means for guiding tape paid off said reel past said opening, and means for causing said transducing means to operatively transduce with respect to the tape paid off said reel as it is driven past said opening.

5. A tape storage and transducing apparatus in accordance with claim 4 including means for advancing said transducing means from a retracted position to a transducing position in engagement with the tape aligned with the opening in said housing after predeterminately locating said magazine on said housing to permit transducing operations with respect to the tape.

6. A tape storage and transducing apparatus in accordance with claim 5 including wheel drive means supported by the housing and mans for simultaneously advancing said wheel drive means to engage the tape when the cartridge is predeterminately located on the housing, means for rotating the wheel of the drive means to drive the tape from said reel as the reel is driven to pay out the tape therefrom.

7. A tape storage and transducing apparatus in accordance with claim 6 whereby said reel has a hub accessible to the exterior of said cartridge, the end of said shaft being coupleable to said hub for rotating said reel in said housing as the shaft is rotated.

8. A tape storage and transducing apparatus in accordance with claim 7, including switch control means operable after said cartridge is predeterminately located on said housing for energizing and operating said electromechanical actuation means to project said shaft to cause said coupling means to engage said reel hub.

9. A tape transport apparatus comprising in combination with a cartridge containing record tape, a support, means for receiving and operatively locating a tape cartridge on said support, said cartridge having a reel for receiving said tape, means for defining a path along which the tape may be moved towards said reel, a hub supporting said reel in said cartridge, capstan means located relative to said cartridge support to be positioned on one side of said tape path, first means moveable when said magazine is predeterminately located on said support to place said tape and said capstan means in driving engagement with each other, second means supported by said support and moveable to engage said hub of said reel simultaneously as the tape and capstan means are brought into driving engagement with the tape, said second means including a shaft, means for rotating said shaft to rotate said reel in a tape winding direction, and transducing means positioned along said tape path to scan said tape and transduce signals relative thereto as the tape is driven onto said reel.

* * * * *